US012566527B2

(12) United States Patent
Chang et al.

(10) Patent No.: US 12,566,527 B2
(45) Date of Patent: \*Mar. 3, 2026

(54) SUBSTRATE ASSEMBLY

(71) Applicant: InnoLux Corporation, Miao-Li County (TW)

(72) Inventors: Chia-Hsiung Chang, Miao-Li County (TW); Yang-Chen Chen, Miao-Li County (TW); Kuo-Chang Su, Miao-Li County (TW); Hsia-Ching Chu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 19/001,132

(22) Filed: Dec. 24, 2024

(65) Prior Publication Data

US 2025/0130679 A1 Apr. 24, 2025

Related U.S. Application Data

(63) Continuation of application No. 18/513,901, filed on Nov. 20, 2023, now Pat. No. 12,216,873, which is a continuation of application No. 18/149,815, filed on Jan. 4, 2023, now Pat. No. 11,861,128, which is a continuation of application No. 17/249,738, filed on Mar. 11, 2021, now Pat. No. 11,573,670, which is a (Continued)

(30) Foreign Application Priority Data

Mar. 23, 2015 (TW) .................................. 104109150

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05); *G06F 3/0445* (2019.05)

(58) Field of Classification Search
None
See application file for complete search history.

(56) References Cited

U.S. PATENT DOCUMENTS

| | | | | |
|---|---|---|---|---|
| 5,810,623 A | * | 9/1998 | Regnier | ............... H01R 12/721 |
| | | | | 439/885 |
| 6,744,091 B1 | * | 6/2004 | Ema | ..................... H10B 12/033 |
| | | | | 257/E21.654 |

(Continued)

*Primary Examiner* — Fred Tzeng

(74) *Attorney, Agent, or Firm* — McClure, Qualey & Rodack, LLP

(57) ABSTRACT

A substrate assembly is provided, including a first substrate, an active element layer, a plurality of first electrodes, a circuit substrate, and a plurality of second electrodes. The active element layer is disposed on the first substrate. The plurality of first electrodes are disposed on the first substrate and arranged along a first direction. The circuit substrate is partially overlapping the first substrate in a vertical projection direction. The plurality of second electrodes are disposed on the circuit substrate. A distance between the edge of one of the plurality of second electrodes and the edge of one of the plurality of first electrodes is greater than zero in the first direction, and a width of the one of the plurality of first electrodes is different from a width of the one of the plurality of second electrodes.

4 Claims, 10 Drawing Sheets

Related U.S. Application Data continuation of application No. 16/162,468, filed on Oct. 17, 2018, now Pat. No. 10,976,880, which is a continuation of application No. 14/830,014, filed on Aug. 19, 2015, now Pat. No. 10,133,425.

(56) References Cited

U.S. PATENT DOCUMENTS

| | | | | |
|---|---|---|---|---|
| 7,316,971 | B2 * | 1/2008 | Daubenspeck | H01L 24/03 |
| | | | | 438/618 |
| 7,638,888 | B2 * | 12/2009 | Suzuki | H01L 23/544 |
| | | | | 257/797 |
| 8,451,250 | B2 * | 5/2013 | Hsieh | G06F 3/04184 |
| | | | | 345/173 |
| 8,878,075 | B2 * | 11/2014 | Fujita | G06F 1/16 |
| | | | | 174/250 |
| 9,141,236 | B2 * | 9/2015 | Lai | G06F 3/0443 |
| 9,201,550 | B2 * | 12/2015 | Hung | G06F 3/0443 |
| 9,639,220 | B2 * | 5/2017 | Wang | G06F 3/046 |
| 10,108,289 | B2 * | 10/2018 | Kim | G06F 3/0443 |
| 2013/0153391 | A1 * | 6/2013 | Liu | H03K 17/9622 |
| | | | | 200/600 |
| 2014/0247244 | A1 * | 9/2014 | Wang | G06F 3/0412 |
| | | | | 345/174 |
| 2015/0277655 | A1 * | 10/2015 | Kim | G06F 3/0412 |
| | | | | 345/174 |
| 2016/0282984 | A1 * | 9/2016 | Chang | G06F 3/04164 |

* cited by examiner

SUBSTRATE ASSEMBLY

CROSS REFERENCE TO RELATED APPLICATIONS

This application is a Continuation of U.S. patent application Ser. No. 18/513,901 (now U.S. Pat. No. 12,216,873) filed Nov. 20, 2023 and entitled "SUBSTRATE ASSEMBLY", which is a Continuation of U.S. patent application Ser. No. 18/149,815 (now U.S. Pat. No. 11,861,128) filed Jan. 4, 2023 and entitled "TOUCH DEVICE", which is a Continuation of U.S. patent application Ser. No. 17/249,738 (now U.S. Pat. No. 11,573,670), filed Mar. 11, 2021 and entitled "TOUCH DEVICE", which is a Continuation of U.S. patent application Ser. No. 16/162,468 (now U.S. Pat. No. 10,976,880), filed Oct. 17, 2018 and entitled "TOUCH DEVICE", which is a Continuation of U.S. patent application Ser. No. 14/830,014 (now U.S. Pat. No. 10,133,425), filed Aug. 19, 2015 and entitled "TOUCH DEVICE", which claims priority of Taiwan Patent Application No. 104109150, filed on Mar. 23, 2015, the entirety of which is incorporated by reference herein.

BACKGROUND OF THE INVENTION

Field of the Invention

The present invention relates to a substrate assembly, and in particular to an electrode design of the substrate assembly.

Description of the Related Art

First electrodes of a bonding area of a conventional touch display panel are utilized to be electrically connected to second electrodes on a circuit substrate aligned in a specific direction. Conventionally, the first electrodes are fully corresponding to the second electrodes. A first right angle is formed on an edge of the first electrode, and a second right angle is formed on an edge of the second electrode. When the first and second electrodes are fully connected to each other, the first right angle collides with the second right angle, and the first and second right angles are fragmented due to stress concentration problems. Additionally, when the first electrodes and the second electrodes are fully connected, bubbles between the first electrodes and the second electrodes are difficult to remove. The conventional touch display panel therefore has poor adhesion, and has electrode corrosion problems.

BRIEF SUMMARY OF THE INVENTION

In one embodiment, a substrate assembly is provided, including a first substrate, an active element layer, a plurality of first electrodes, a circuit substrate, a plurality of second electrodes. The active element layer is disposed on the first substrate. The plurality of first electrodes are disposed on the first substrate and arranged along a first direction. At least one of the plurality of first electrodes is electrically connected to the active element layer. The circuit substrate is partially overlapping the first substrate in a vertical projection direction. The plurality of second electrodes are disposed on the circuit substrate. At least one of the plurality of second electrodes overlaps the at least one of the plurality of first electrodes, an edge of the at least one of the plurality of second electrodes is adjacent to an edge of the at least one of the plurality of first electrodes. A distance between the edge of the at least one of the plurality of second electrodes and the edge of the at least one of the plurality of first electrodes is greater than zero. In the first direction, and a width of the at least one of the plurality of first electrodes is different from a width of the at least one of the plurality of second electrodes.

In one embodiment, the first direction is parallel to an extension direction of an edge of the first substrate. In one embodiment, the active element layer includes a plurality of scanning lines and a plurality of data lines. In one embodiment, the first substrate includes a touch sensing structure. In one embodiment, in a top view, the at least one of the first electrodes includes corner with a right angle that is corresponding to a flat portion of the at least one of the second electrodes. In one embodiment, in a top view, the edge of the at least one of the second electrodes is located in a gap between the at least one of the first electrodes and one of the first electrodes close to the at least one of the first electrodes. In one embodiment, the substrate assembly further includes a register mark formed on the first substrate. In one embodiment, the substrate assembly further includes another register mark formed on the circuit substrate.

Therefore, while the first electrode is attached to the second electrode, the first right angle is prevented from colliding with the second right angle, and the stress concentration problem and fragmentation problem are avoided. Additionally, when the first electrode is connected to the second electrode, there are increased exhausting gaps formed between the first electrode and the second electrode in the first direction and the second direction. The bubbles between the first electrode and the second electrode can be exhausted smoothly through the exhausting gaps. The touch display panel of the embodiment of the invention has improved adhesion, and the electrode corrosion problem is prevented.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
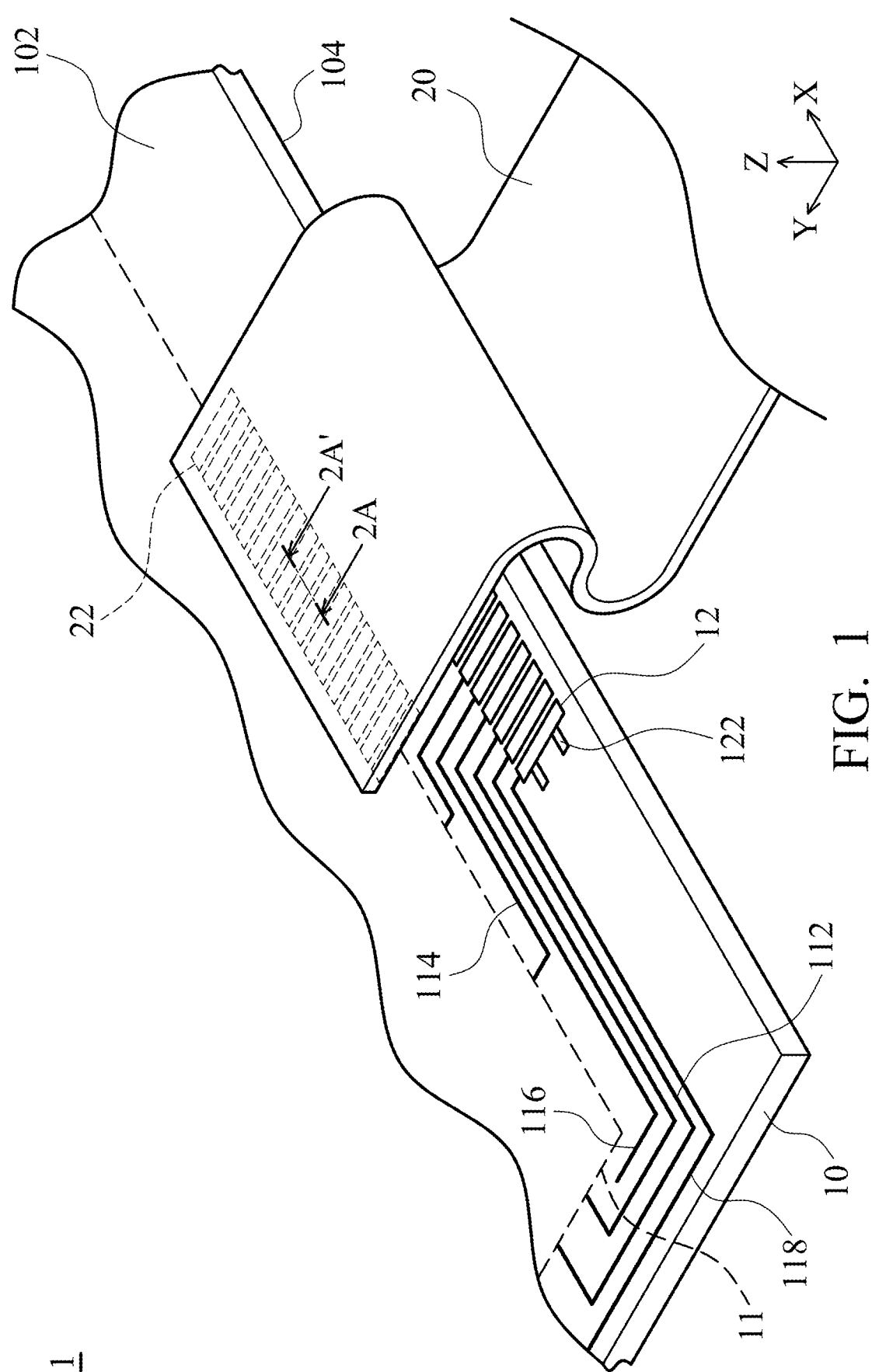
FIG. 1 shows a touch device of a first embodiment of the invention.

FIG. 1 shows a touch device 1 of a first embodiment of the invention, including a first substrate 10 and a circuit substrate 20. The first substrate includes a touch sensing structure 11 (only schematically) and a plurality of first electrodes 12. The touch sensing structure 11 is disposed on the first substrate 10. The first electrodes 12 are electrically connected to the touch sensing structure 11. A circuit board may include the circuit substrate 20 and a plurality of second electrodes 22. That is to said, the plurality of second electrodes 22 are formed on the circuit substrate 20. The circuit board can be a flexible printed circuit board.

The touch sensing structure 11 of the invention can be capacitive, pressure sensitive, electromagnetic, or another touch sensing structure. The capacitive touch sensing structure can utilize mutual capacitive technology or self-capacitive technology or both self-capacitive and mutual capacitive technology. For a mutual capacitive touch sensing structure, for example, the touch sensing structure 11 includes a driving electrode and a receiving electrode (not shown). The driving electrode and the receiving electrode are insulated from each other, but there is coupling capacitance therebetween. The touch sensing structure 11 is electrically connected to the first electrode 12 with a plurality of traces, wherein the traces comprise traces 112 connected to the driving electrodes and the traces 114 connected to the receiving electrodes. A ground line 116 can be disposed between the traces 112 and the traces 114 to decrease noise therebetween. A ground line 118 surrounds the traces 114 to provide static electricity protection. The first electrode 12 disposed outermost may be provided with a first electrode extending portion 122, which can be two elongated shapes as shown in FIG. 1, or other shapes such as register marks when the circuit substrate 20 is attached to the first substrate 10.

Figure 2A:
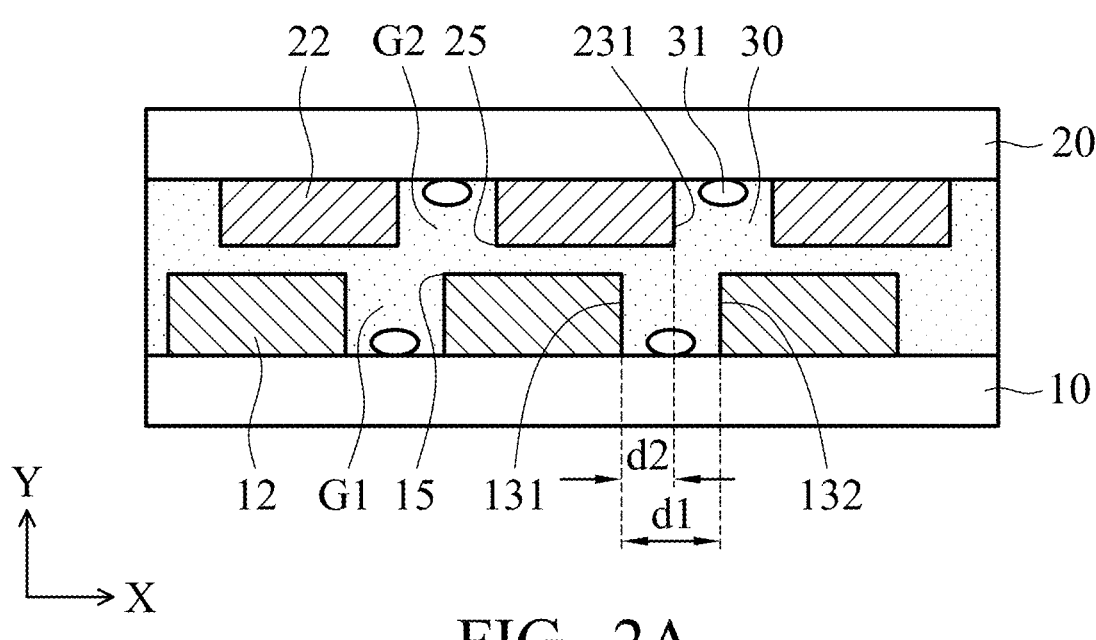
FIG. 2A is a sectional view in 2A-2A' direction of FIG. 1.
Figure 2B:
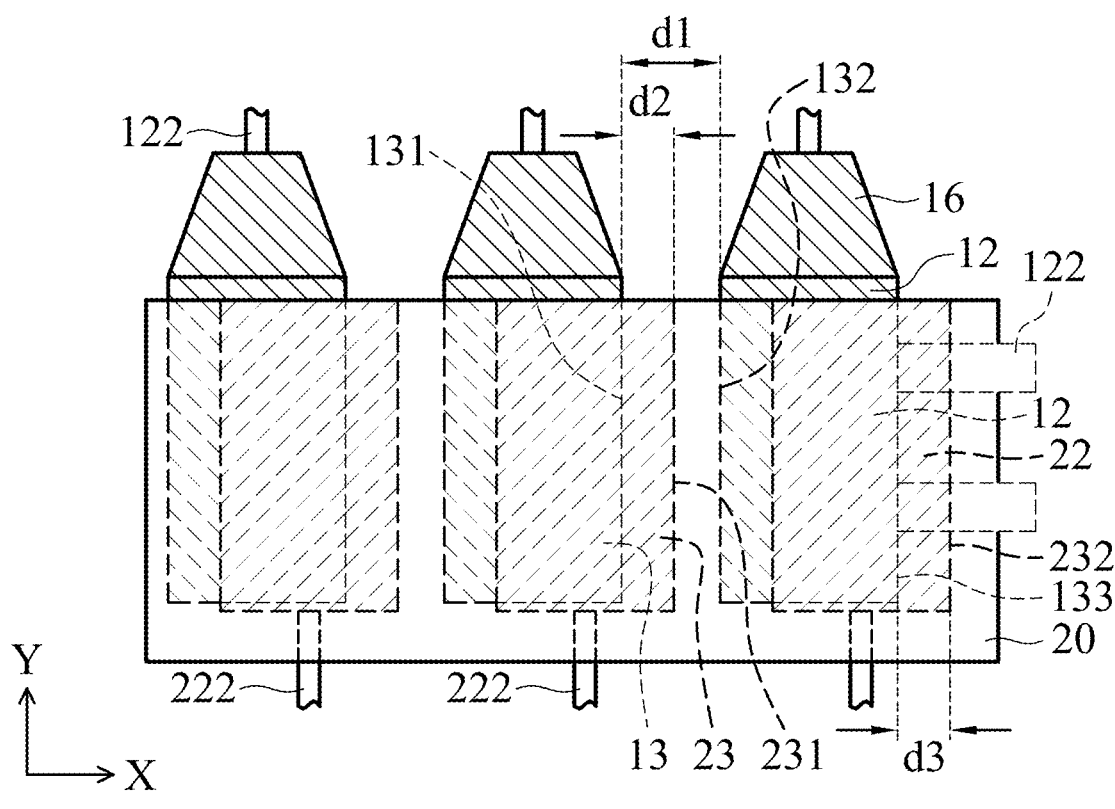
FIG. 2B is a top view of the main portions of the touch device of FIG. 1.

FIG. 2A is a sectional view in 2A-2A' direction of FIG. 1. FIG. 2B is a top view of the main portions of the touch device of FIG. 1. With reference to FIGS. 2A and 2B, a first gap G1 is formed between two adjacent first electrodes 12. A minimum distance between the two adjacent first electrodes 12 is a gap distance d1 of the first gap G1. The gap distance d1 is defined as the minimized straight distance between the opposite side edges of the two adjacent first electrodes 12. The circuit substrate 20 partially overlaps the first substrate 10 in a vertical projection direction (third direction Z) of the first substrate 10. In other words, if we look at the circuit substrate 20 and the first substrate 10 from the vertical projection direction that is perpendicular to the first substrate 10, the circuit substrate 20 would partially overlaps the first substrate 10. A plurality of second gaps G2 are formed between the two adjacent second electrodes 22 (a second gap G2 is formed between each two adjacent second electrodes 22). At least one of the first electrodes 12 has an offset distance d2 with at least one of the corresponding second electrodes 22 in a first direction X. The offset distance d2 is greater than zero and smaller than half of the corresponding gap distance d1. In one embodiment, the offset distance d2 is greater than zero and smaller than one third of the corresponding gap distance d1. In other words, as shown in FIG. 2B, the two adjacent first electrodes respectively have a first electrode side edge 131 and a first electrode side edge 132 facing each other. The minimized gap distance d1 is formed between first electrode side edges 131 and 132. The two adjacent second electrodes 22 are electrically connected to the two corresponding first electrodes 12 by a conductive glue layer 30. A touch sensing signal travels from the first electrodes 12 to the second electrodes 22. One of the two second electrodes 22 has a second electrode side edge 231 located between the first electrode side edges 131 and 132. The second electrode side edge 231 corresponds the shortest distance d2 of the first electrode side edge 131 of the first electrode 12 in the X direction electrically connected thereto, which is smaller than half or one third of the gap distance d1. A gap distance d3 is formed between a second electrode side edge 232 of another second electrode 22 and a corresponding first electrode side edge 133 in the X direction as shown in FIG. 2B. The value of the gap distance d3 can be the same or close to the value of the gap distance d2, and the difference therebetween can be within 10% of the gap distance d2.

In one embodiment, the roughness of the first electrode side edge 131, 132 or 133 can be different to the roughness of the second electrode side edge 231 or 232. Increased roughness increases attachment between the conductive glue layer 30 and the first electrode 12 or the second electrode 22. In another embodiment, one of the first electrodes comprises a first electrode extending portion 122 as a register mark when the circuit substrate 20 is attached to the first substrate 10. The circuit board can comprise a corresponding register mark (not shown) formed on the circuit substrate 20. The second electrode 22 partially covers the first electrode extending portion 122, which also improves the attachment between the conductive glue layer 30 and the first electrode 12 or the second electrode 22, and increases the electrical connection area between the first electrode 12 and the second electrode 22.

Figure 3:
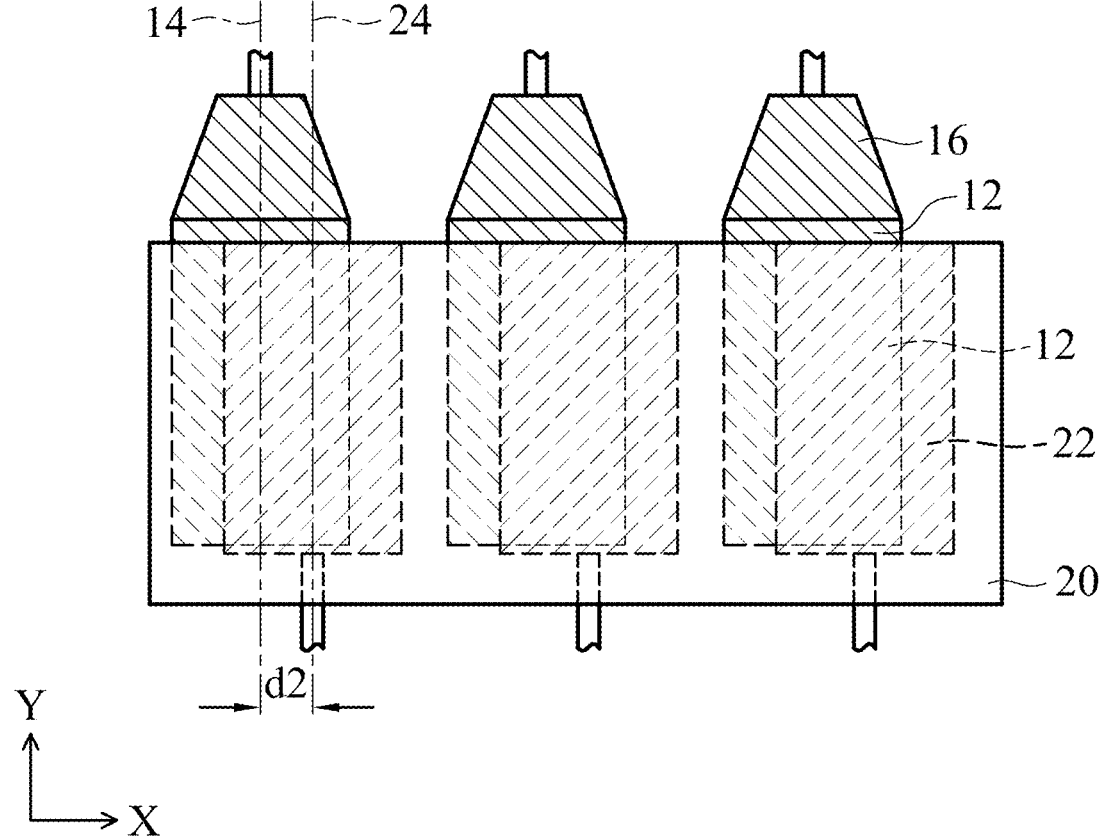
FIG. 3 shows a modified embodiment of the first embodiment.

With reference to FIG. 3, in another embodiment, when the shape of the first electrode 12 and the shape of the second electrode 22 are symmetrical shapes (for example, rectangular, oval, etc.), each first electrode 12 comprises a first central axis 14, and each second electrode 22 comprises a second central axis 24. The central axis means a symmetrical central axis of the electrode. An offset distance d2 is formed between the first central axis 14 and the corresponding second central axis 24.

With reference to FIG. 2A, in one embodiment, a first right angle 15 is formed on an edge of the first electrode 12, and a second right angle 25 is formed on an edge of the second electrode 22. When the first electrode 12 is connected to the second electrode 22, the first right angle 15 is corresponding to a flat portion of the second electrode 22 rather than the second right angle 25. The second right angle 25 is corresponding to a flat portion of the first electrode 12 rather than the first right angle 15. Therefore, while the first electrode 12 is attached to the second electrode 22, the first right angle 15 is prevented from colliding with the second right angle 25, and the stress concentration problem and fragmentation problem are avoided.

With reference to FIGS. 2A and 2B, when the first electrode 12 is connected to the second electrode 22, there are increased exhausting gaps formed between the first electrode 12 and the second electrode 22 in the first direction X and the second direction Y. The bubbles between the first electrode 12 and the second electrode 22 can be exhausted smoothly through the exhausting gaps. The touch display panel of the embodiment of the invention has improved adhesion, and the electrode corrosion problem is prevented.

With reference to FIG. 2A, in one embodiment, the conductive glue layer 30 contacts at least portions of the first electrode 12 and the second electrode 22 to electrically connect the first electrode 12 and the second electrode 22. The first electrode 12 can be partially or fully electrically connected to the second electrode 22 via the conductive glue layer 30.

With reference to FIG. 2B, in one embodiment, each first electrode 12 has a tapered portion 16. The tapered portion 16 is not corresponding to the second electrode 22 in the vertical projection direction. The tapered portion 16 improves impedance matching and design flexibility of the trances.

With reference to FIG. 3, in one embodiment, the width of each first electrode 12 is the same as or different from the width of each second electrode 22. The ratio between the width of each first electrode 12 and the width of each second electrode 22 is 0.8 to 1.3. The width of each first electrode 12 can be the same as the width of each second electrode 22.

Figure 4:
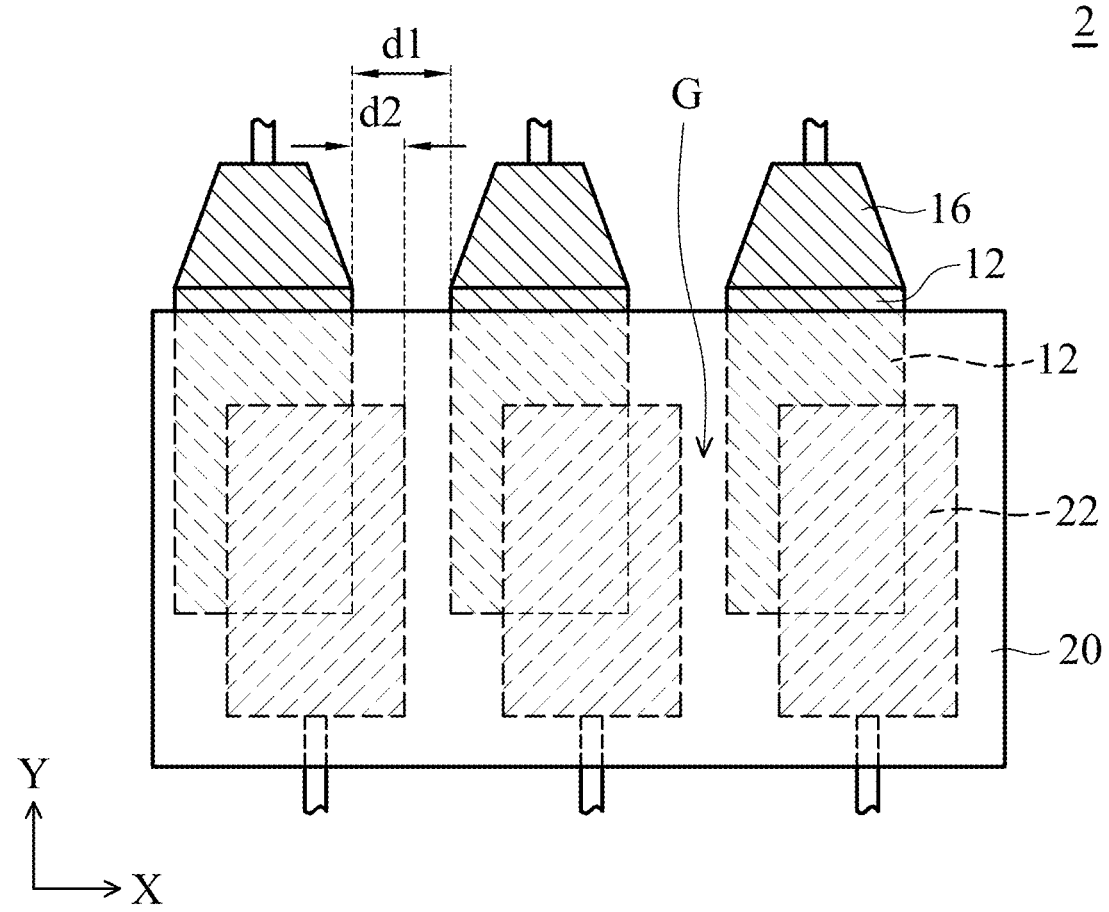
FIG. 4 shows a touch device of a second embodiment of the invention.

FIG. 4 shows a touch device 2 of a second embodiment of the invention, including a first substrate 10 and touch sensing structure 20. The first substrate 10 comprises a touch sensing structure 11 and a plurality of first conductive pads 12. The touch sensing structure 11 is disposed on the first substrate 10. The first conductive pads 12 are arranged along a first direction X, wherein a space area G is formed between the two adjacent first conductive pads 12, and a minimum distance between the two adjacent first conductive pads 12 is a gap distance d1. A plurality of second conductive pads 22 are formed on the circuit substrate 20. At least one of the second conductive pads 22 partially overlaps a space area G in a vertical projection direction of the first conductive pads 12. In other words, if we look at the second conductive pads 22 and the first substrate 10 from the vertical projection direction that is perpendicular to the second conductive pads 22, the circuit substrate 20 would partially overlaps the space area G. An offset distance d2 is formed between an outline of at least one of the second conductive pads 22 and an outline of one of the two adjacent first conductive pads 12 in the first direction X, and the offset distance d2 is smaller than half of the gap distance d1. In other words, as viewed in the vertical projection direction, a portion of the outline of one of the two adjacent second conductive pads 22 is located in the space area G of the corresponding (electrically connected) two adjacent first conductive pads 12. The minimum distance d2 between the outline of the second conductive pads 22 and the outline of the corresponding (electrically connected) first conductive pads 12 in the X direction is smaller than half or one third of the gap distance d1.

In the second embodiment, when the first electrode 12 is connected to the second electrode 22, there are increased exhausting gaps (offset) formed between the first electrode 12 and the second electrode 22 in the first direction X and the second direction Y. The bubbles between the first electrode 12 and the second electrode 22 can be exhausted smoothly through the exhausting gaps.

The embodiments above can be utilized in various touch devices. In the following examples, several touch devices are described, wherein the elements with the same functions follow the same labels, and the function description thereof are omitted.

Figure 5A:
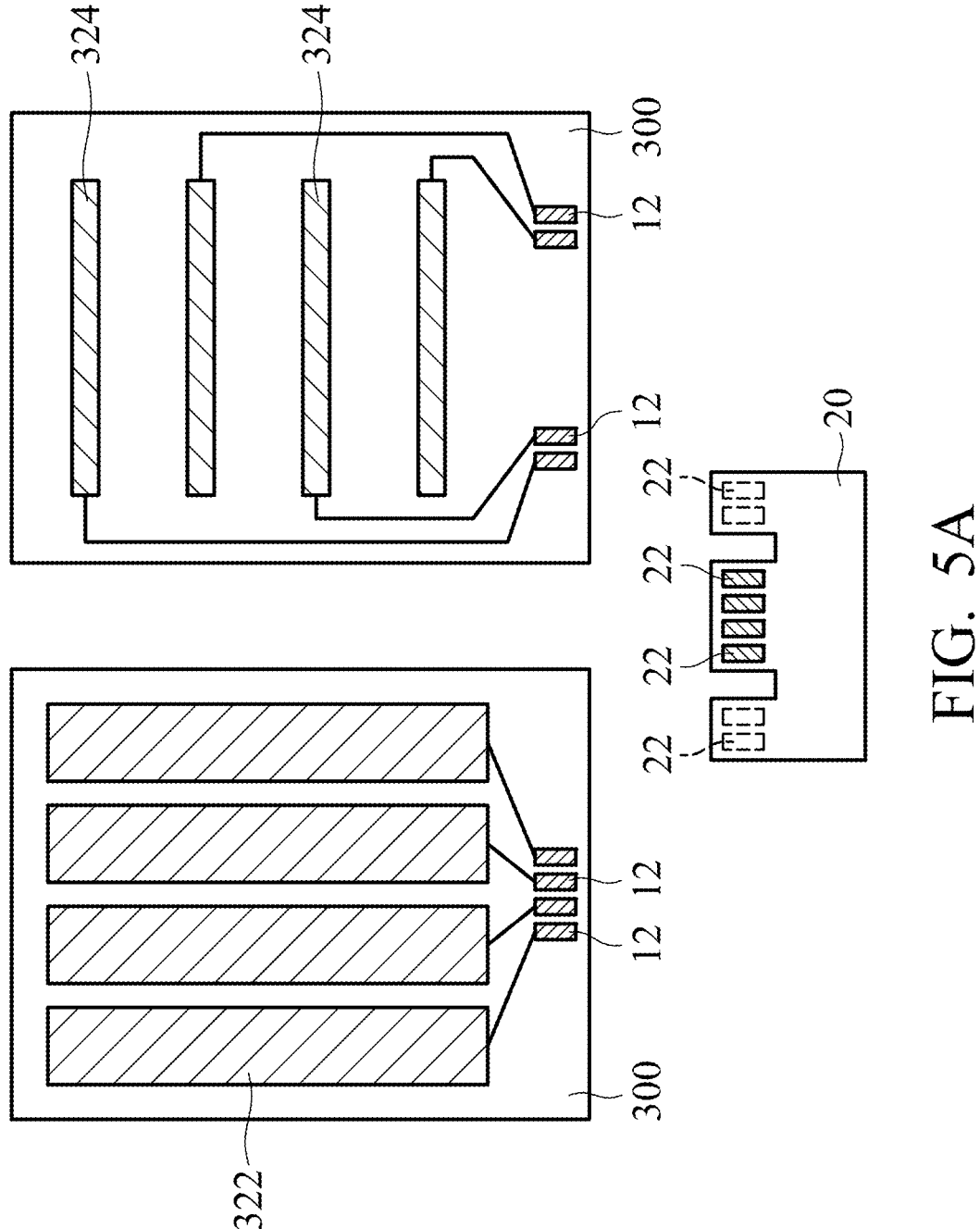
FIG. 5A shows a capacitive touch device of an embodiment of the invention, wherein the first electrodes, the second electrodes and the touch sensing structure of both sides of the substrate are shown.
Figure 5B:
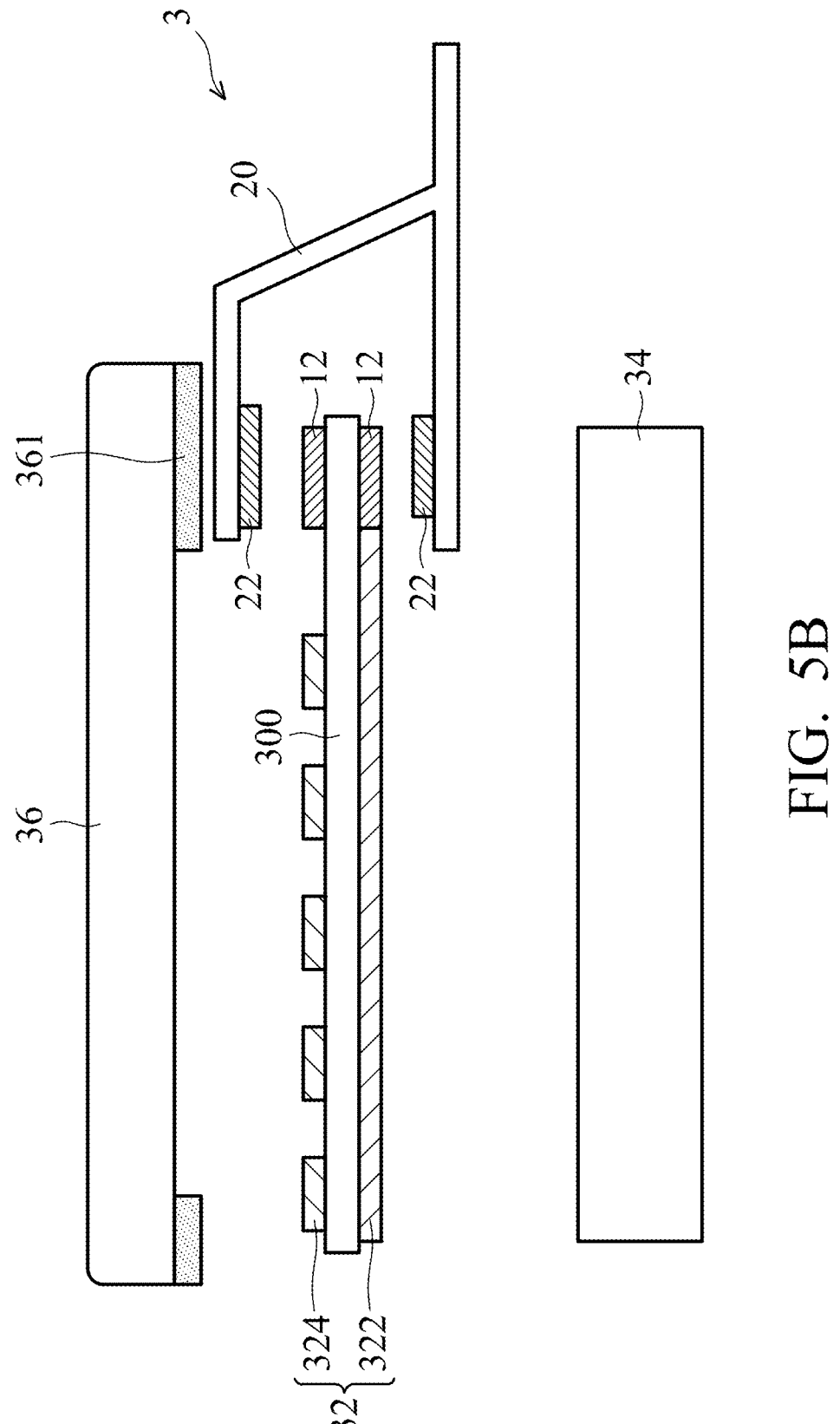
FIG. 5B is a top view of the embodiment of FIG. 5A.

FIGS. 5A and 5B show a capacitive touch device 3 of an embodiment of the invention. A touch sensing structure 32 is disposed on two sides of a first substrate 300, and comprises patterned driving electrodes 322 and patterned receiving electrodes 324. A plurality of first electrodes 12 are divided into two groups respectively provided on both sides of the first substrate 300 and the two groups are respectively electrically connected to the patterned driving electrodes 322 and the patterned receiving electrodes 324. The second electrodes 22 are formed on both sides of the circuit substrate 20, wherein the circuit board may be a flexible printed circuit board (FPCB). A display 34 can be disposed under the capacitive touch device 3, and a cover lens 36 can be attached to the top surface of the capacitive touch device 3. The display 34 can be a liquid-crystal display (LCD), an organic light-emitting diode display (OLED), an electro-phoretic display (EPD), an electrode-wetting display (EWD) or a quantum dot display (QD).

Figure 6A:
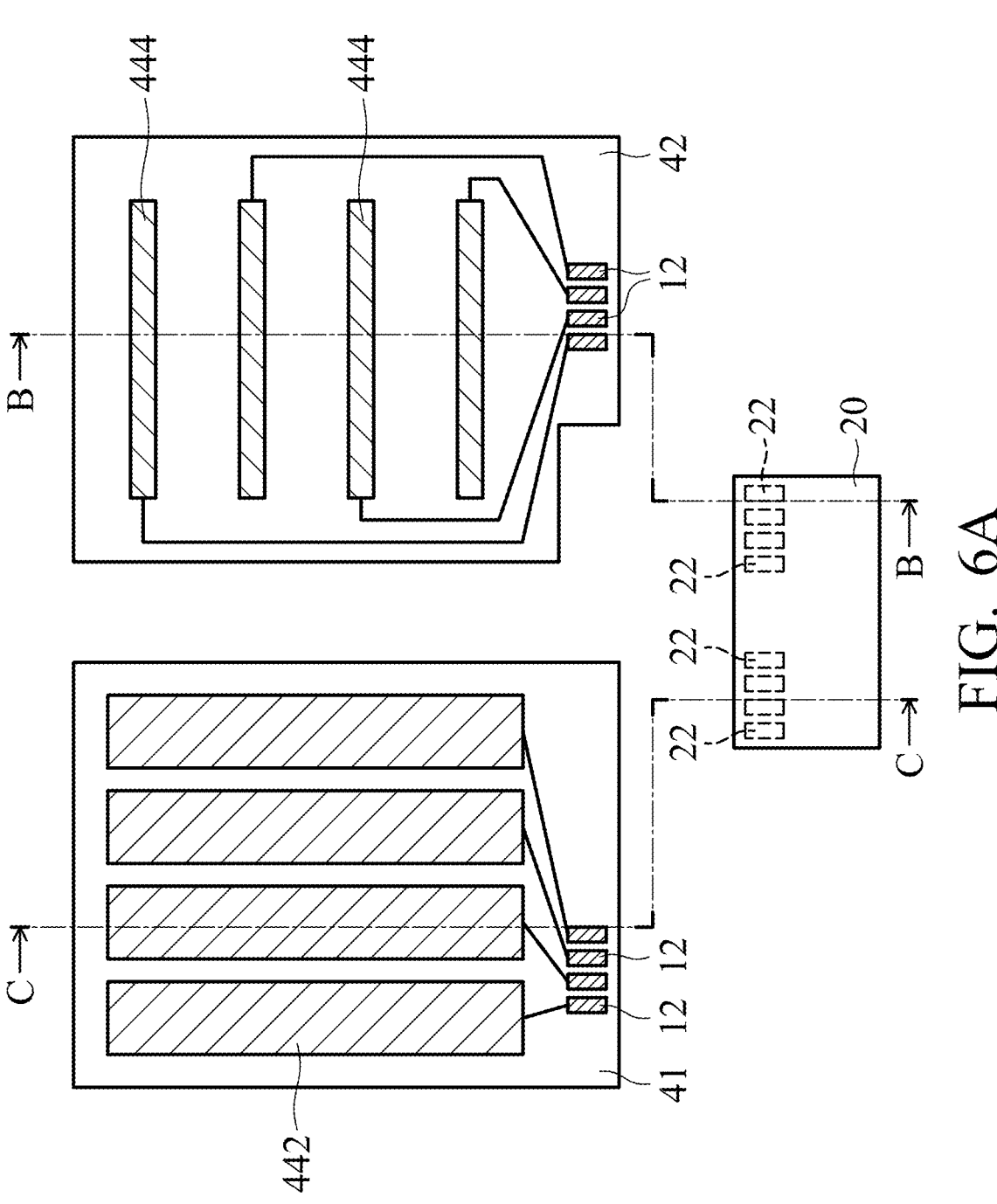
FIG. 6A shows a capacitive touch device of an embodiment of the invention, wherein the first electrodes, the second electrodes and the touch sensing structure of both sides of the substrate are shown.
Figure 6B:
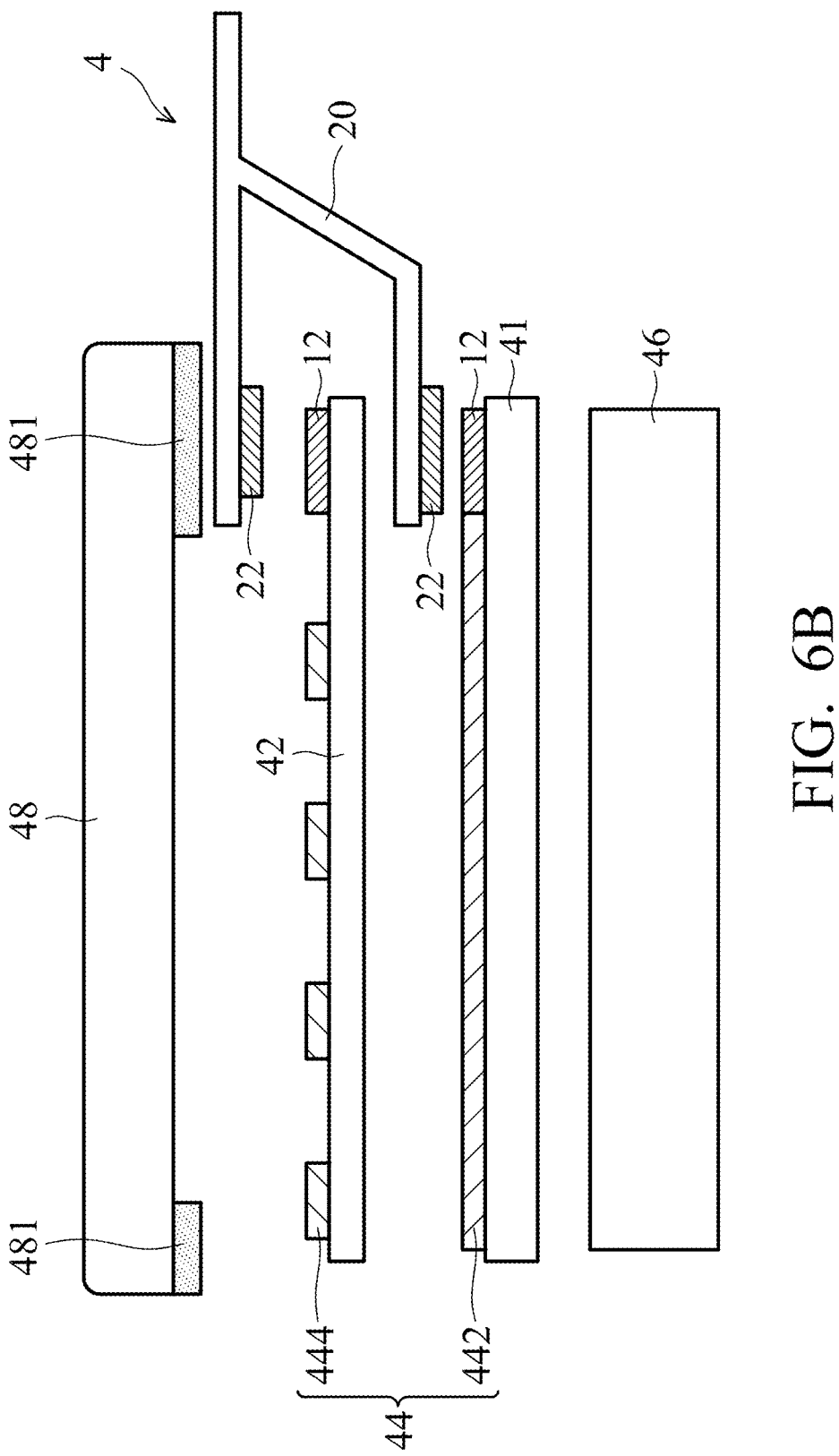
FIG. 6B is a sectional view along B-B and C-C lines of FIG. 6A.

FIGS. 6A and 6B show a capacitive touch device 4 of an embodiment of the invention, wherein FIG. 6B is a sectional view along lines A-A and B-B of FIG. 6A. The touch sensing electrode structure 44 comprises patterned driving electrodes 442 and patterned receiving electrodes 444. The driving electrodes 442 are disposed on the first substrate 41, and the patterned receiving electrodes 444 are disposed on the second substrate 42. A plurality of first electrodes 12 are divided into two groups respectively disposed on the first substrate 41 and second substrate 42, and the two groups are respectively electrically connected to the patterned driving electrodes 442 and the patterned receiving electrodes 444. The second electrodes 22 are formed on one side of the circuit substrate 20, and are electrically connected to the first electrodes 12. The thickness of the first substrate 41 may be greater than or equal to the thickness of the second substrate 42. In this embodiment, the thickness of the first substrate 41 is between 150 μm~50 μm, the thickness of the second substrate 42 is between 110 μm~10 μm. For example, the first substrate 41 and the second substrate 42 are plastic substrates or polymer film substrates (for example, made of polyimide). The thickness of the first substrate 41 (70 μm~120 μm) is greater than the thickness of the second substrate 42 (10 μm~60 μm). The thickness of the second substrate 42 is smaller, and therefore the same piece of circuit substrate 20 (such as a flexible printed circuit substrate) can be docked. A conductive glue layer (for example, anisotropy conductive film, ACF, not shown) can be disposed between the substrates 41, 42, and the substrate (FPC substrate) 20 to electrically connect the first electrodes 12 to the second electrodes 22. The substrates 41 and 42 and the circuit substrate 20 are flexible. Therefore the off difference of 10 μm~60 μm does not decrease bonding effect. Thus, the second electrodes 22 can be simultaneously coupled to the first electrodes 12 of the substrates 41 and 42 through only one circuit substrate 20 and one bonding process. A display 464 can be disposed under the capacitive touch device 4, and a cover lens 48 can be attached to the top surface of the capacitive touch device 4 to form a touch display device. The display 46 can be a liquid-crystal display, an organic light-emitting diode display, an electro-phoretic display, an electrode-wetting display or a quantum dot display.

Figure 7:
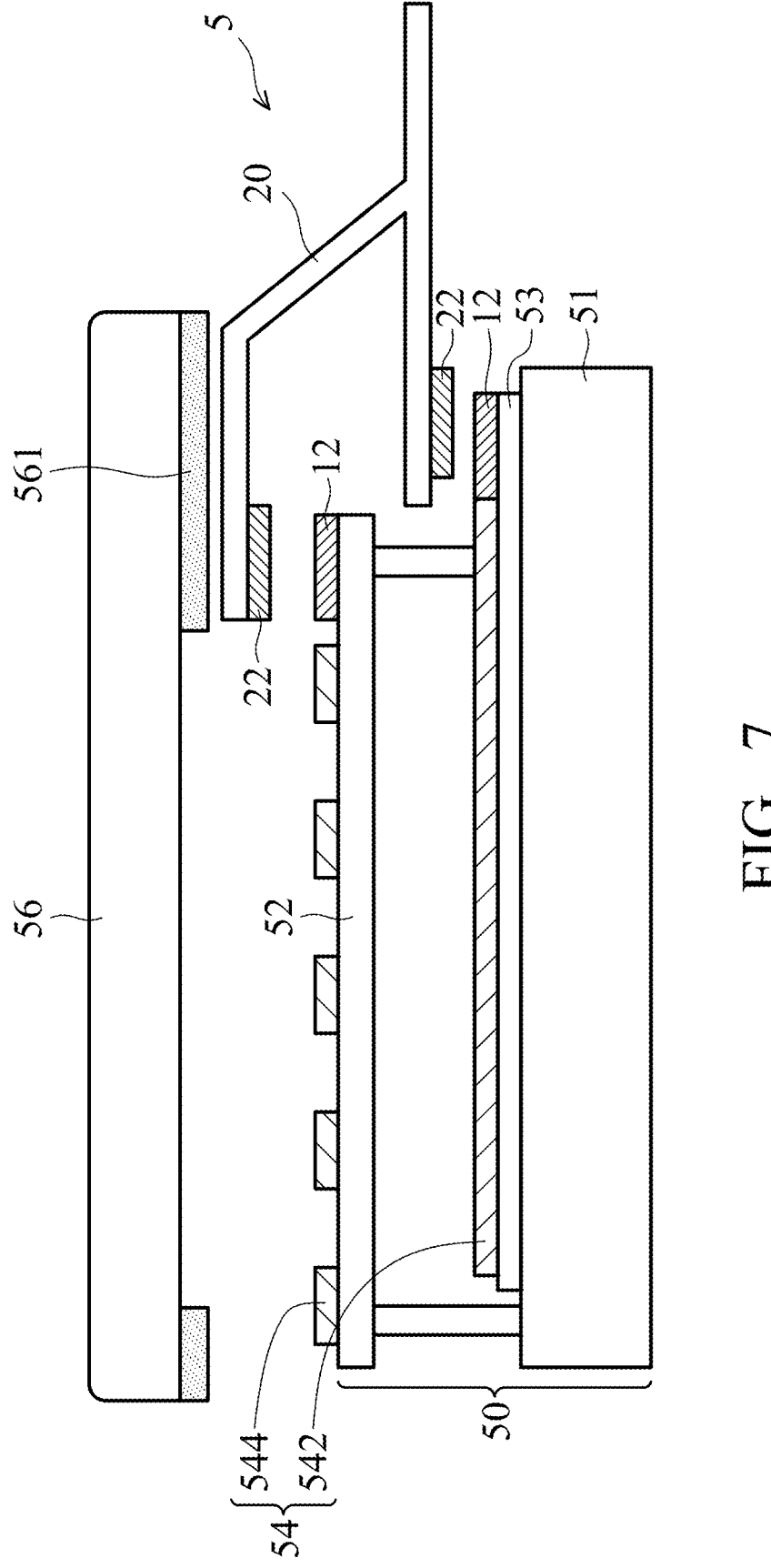
FIG. 7 shows a capacitive touch device of an embodiment of the invention, wherein the touch sensing structure incorporated on the display is shown.

FIG. 7 shows a capacitive touch device 5 of an embodiment of the invention. A display 50 comprises a first substrate 51 and a second substrate 52. An active element layer 53 (e.g., a patterned stacked layer with TFT elements) is disposed on the first substrate 51. The display 50 can be a liquid-crystal display (LCD), an organic light-emitting diode display (OLED), an electro-phoretic display (EPD), an electrode-wetting display (EWD) or a quantum dot display (QD). The touch sensing electrode structure 54 comprises patterned driving electrodes 542 and patterned receiving electrodes 544. The driving electrodes 542 are disposed on the substrate 51. The receiving electrodes 544 are disposed on the substrate 52. The substrate 52 can be a color filter substrate of LCD or an upper package cover of OLED. A plurality of first electrodes 12 are divided into two groups respectively disposed on the first substrate 51 and second substrate 52, and the two groups are respectively electrically connected to the patterned driving electrodes 542 and the patterned receiving electrodes 544. The second electrodes 22 are formed on one side of the circuit substrate 20, and are electrically connected to the first electrodes 12 by, for example, anisotropy conductive film (ACF). The driving electrodes 542 can be formed by any conductive layer of the active element layer 53 (for example, a metal layer with scanning lines or data lines), or formed by a separated patterned conductive layer. The driving electrodes 542 can be formed by patterned anodes or patterned cathodes of OLED element (not shown). A decorative layer 561 is provided on a cover lens 56 to shield the circuit substrate 20, the first electrodes 12, the second electrodes 22 and the other metal traces should be hidden (not shown).

A further embodiment can be derived from the embodiment of FIG. 7. The driving electrodes 542 can be omitted from the touch sensing structure 54. The receiving electrodes 544 are no longer only for receiving sensing signals. According to the design of the electrode pattern, mutual capacitive sensing technology or self-capacitive sensing technology can be utilized. For example, the patterns of a part of the receiving electrodes 544 are amended to have driving function. In another example, each receiving electrodes 544 are amended to have driving and receiving functions.

Figure 8:
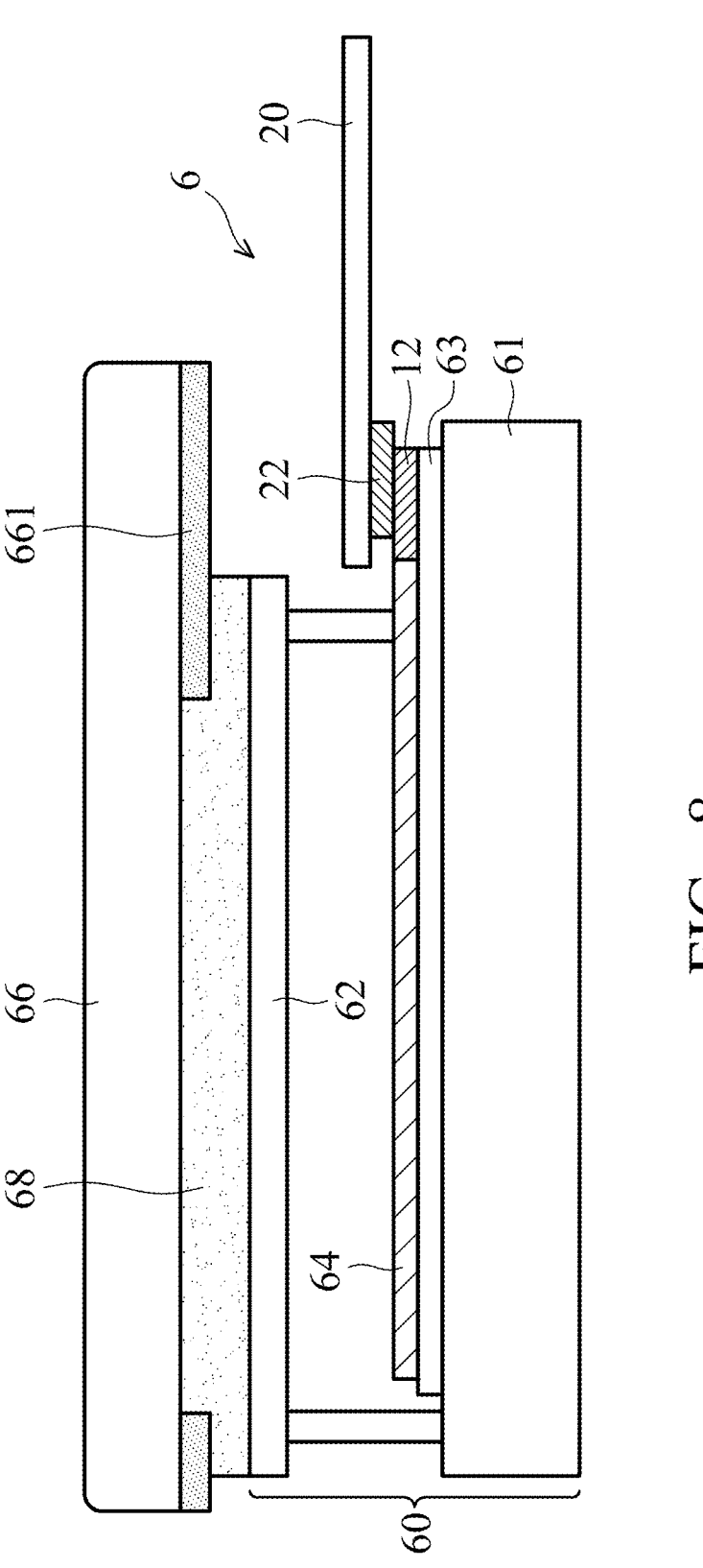
FIG. 8 shows a capacitive touch device of an embodiment of the invention, wherein the touch sensing structure incorporated on the display is shown.

FIG. 8 shows a capacitive touch device 6 of an embodiment of the invention. A display 60 comprises a first substrate 61 and a second substrate 62. An active element layer 63 (e.g., a patterned stacked layer with TFT elements) is disposed on the first substrate 61. The display 60 can be a liquid-crystal display (LCD), an organic light-emitting diode display (OLED), an electro-phoretic display (EPD), an electrode-wetting display (EWD) or a quantum dot display (QD). The touch sensing structure 64 can be a single layer or a multi-layer patterned electrode layer with the functions of receiving electrodes and driving electrodes. The substrate 62 can be a color filter substrate of LCD or an upper package cover of OLED. The cover lens 66 is attached to the second substrate 62 by optical glue layer 68, and a light-shielding layer 661 on the cover lens 66 shields the circuit substrate 20 and the electrodes 12 and 22 therebelow.

The substrates (including the first and second substrates) mentioned above can be general glass substrates, alkali-free glass substrates (e.g. LCD substrate), chemically or physically treated strengthen glass substrates (e.g. cover lens), or plastic substrates such as polyethylene terephthalate (PET) substrate, polycarbonate (PC) substrate, polymethyl methacrylate (PMMA) substrate or cycloolefin polymer (COP) substrate.

The material of the electrodes of the touch sensing structures 11, 32, 44, 54 and 64 can be transparent conductive materials such as indium tin oxide (ITO) or indium zinc oxide (IZO), or metal material such as Ag, Cu, Al, Mo, Nd, Au, Cr or alloy thereof, or other materials such as graphene, silicon alkenyl, or nano silver. The first electrodes and the second electrodes 22 can utilize the material mentioned above. The touch sensing structures 11, 32, 44, 54 and 64 (including the first electrode traces 122 and the second electrode traces 222) can be single layer patterned electrodes or multi-layered patterned electrodes stacked with insulating layers. When the electrode material is metal materials, patterned metal electrodes can be constituted by thin metal traces. The width of the thin metal trace is between 0.05

μm~6 μm, preferably between 0.08 μm~4 μm. The aperture ratio of the patterned metal electrode in a unit area is between 85% and 99%. The first electrode 12, the second electrode 22, the first electrode traces 122 and second electrode traces 222 can be formed by patterned metal electrodes.

In the embodiments, the first electrode 12 is the first conductive pads 12, and the second electrode 22 is the second conductive pads 22, which are the same elements with same functions and different names.

The cover lenses 36, 48, 56 and 66 in the embodiments described above can be physically or chemically treated tempered glass substrates, e.g., chemically ion exchange treated glass substrate or physical heat treated glass substrate. The cover lenses 36, 48, 56 and 66 can also be a polarizing sheet (linear or circular polarizing sheet) to replace the cover lenses 6, 48, 56 and 66. Multi-functional film (single layer or multi-layer) is coated or plated on the surface of the polarizing sheet to provide a function such as anti-reflective, anti-glare, anti-pollution, or improving light transmittance.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A substrate assembly, comprising:
   a substrate;
   an active element disposed on the substrate;
   a plurality of first electrodes disposed on the substrate, and arranged along a first direction, wherein at least one of the plurality of first electrodes is electrically connected to the active element layer;
   a circuit structure disposed on the substrate;
   a plurality of second electrodes disposed between the circuit structure and the plurality of first electrodes, wherein an edge of at least one of the plurality of second electrodes is adjacent to an edge of at least one of the plurality of first electrodes, and wherein a distance between the edge of the at least one of the plurality of second electrodes and the edge of the at least one of the plurality of first electrodes is greater than zero; and
   a glue layer disposed between the circuit structure and the substrate, wherein the glue layer contacts the edge of the at least one of the plurality of first electrodes and the edge of the at least one of the plurality of second electrodes.

2. The substrate assembly as claimed in claim 1, wherein in the first direction, and a width of the at least one of the plurality of first electrodes is different from a width of the at least one of the plurality of second electrodes.

3. The substrate assembly as claimed in claim 1,
wherein in a top view, the at least one of the plurality of
   first electrodes and the at least one of the plurality of
   second electrodes are overlapped.

4. The substrate assembly as claimed in claim 1,
wherein the at least one of the plurality of first electrodes
   and the at least one of the plurality of second electrodes
   have a overlapped region, and the at least one of the
   plurality of first electrodes comprises a extending por-
   tion,
wherein a width of the extending portion is less than a
   width of the overlapped region in the first direction.

\* \* \* \* \*